United States Patent
Ohnishi

(10) Patent No.: US 7,164,459 B2
(45) Date of Patent: Jan. 16, 2007

(54) METHOD FOR FABRICATING A LIQUID CRYSTAL DISPLAY DEVICE HAVING INORGANIC ALIGNMENT FILM MADE OF CRYSTALLINE CONDUCTIVE FILM

(75) Inventor: Noriaki Ohnishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/109,808

(22) Filed: Apr. 20, 2005

(65) Prior Publication Data

US 2005/0208713 A1 Sep. 22, 2005

Related U.S. Application Data

(62) Division of application No. 10/621,522, filed on Jul. 18, 2003, now Pat. No. 6,912,031.

(30) Foreign Application Priority Data

Jul. 18, 2002 (JP) ............................. 2002-209129

(51) Int. Cl.
*G02F 1/1333* (2006.01)
(52) U.S. Cl. ...................... 349/123; 349/124; 349/125; 349/126; 349/127
(58) Field of Classification Search ................ 349/123, 349/124, 125, 126, 127
See application file for complete search history.

(56) References Cited

U.S. PATENT DOCUMENTS 4,980,041 A * 12/1990 Kaganowicz et al. .. 204/192.15
5,403,771 A * 4/1995 Nishida et al. ................ 438/97
6,020,946 A 2/2000 Callegari et al.
6,061,114 A 5/2000 Callegari et al.
6,414,737 B1 7/2002 Reznikov et al.
6,617,056 B1 * 9/2003 Hara et al. ................... 428/697
2003/0210371 A1 * 11/2003 Chaudhari et al. .......... 349/124

FOREIGN PATENT DOCUMENTS

| EP | 0 525 478 B1 | 6/1997 |
|----|----|----|
| JP | 2-222927 A | 9/1990 |
| JP | 2-294618 A | 12/1990 |
| JP | 6-130391 A | 5/1994 |
| JP | 7-56172 A | 3/1995 |
| JP | 9-218409 A | 8/1997 |
| JP | 2001-21891 A | 1/2001 |

OTHER PUBLICATIONS

Article "Effect of Chemical Structures of Polyimides on Photo-Alignment of Liquid Crystals," vol. 333, pp. 165-179, 1999 OPA N.V. Published by license under the Gordon and Breach Science Publishers imprint.
Oyo Buturi, vol. 64, No. 12, pp. 1225-1229, 1995.

* cited by examiner

*Primary Examiner*—David Nelms
*Assistant Examiner*—(Nancy) Thanh-Nhan P Nguyen
(74) *Attorney, Agent, or Firm*—Birch, Stewart, Kolasch & Birch, LLP

(57) ABSTRACT

A method for fabricating a liquid crystal display device, which includes a liquid crystal layer, a pair of electrodes for use to apply a voltage to the liquid crystal layer, and at least one inorganic alignment film. The inorganic alignment film makes direct contact with the liquid crystal layer and is made of a crystalline conductive film where crystal grains are oriented in a predetermined direction preferentially.

5 Claims, 3 Drawing Sheets

METHOD FOR FABRICATING A LIQUID CRYSTAL DISPLAY DEVICE HAVING INORGANIC ALIGNMENT FILM MADE OF CRYSTALLINE CONDUCTIVE FILM

This application is a Divisional of co-pending application Ser. No. 10/621,522, filed on Jul. 18, 2003, and for which priority is claimed under 35 U.S.C. § 120; and this application claims priority of application No. 2002-209129 filed in Japan on Jul. 18, 2002 under 35 U.S.C. § 119; the entire contents of all are hereby incorporated by reference.

BACKGROUND OF THE INVENTION

1. Field of the Invention

The present invention relates to a liquid crystal display device and a method for fabricating the device. As used herein, the "liquid crystal display devices" include both a direct viewing liquid crystal display device and a projection type liquid crystal display device.

2. Description of the Related Art

A liquid crystal display (LCD) conducts a display operation by utilizing variations in the polarization states of an incoming light ray being transmitted through the liquid crystal layer thereof. The polarization state of the incoming light ray is changed by orientation directions of liquid crystal molecules, which in turn are changeable with the application of a voltage to the liquid crystal layer. In the LCD, a display panel, including the liquid crystal layer and electrodes and circuit components for use to apply a voltage to the liquid crystal layer, will be referred to herein as an "LCD panel". The LCD includes not only the LCD panel but also a driver circuit, a power supply circuit and a light source. Portions of the driver circuit and power supply circuit may either form integral parts of the LCD panel or be mounted on the LCD panel.

The LCD panel typically includes two substrates and a liquid crystal layer provided between the substrates. Each of the two substrates includes an alignment film that faces the liquid crystal layer. The alignment films are provided so as to align liquid crystal molecules in a predetermined direction in the liquid crystal layer.

The alignment films are normally formed in the following manner.

Specifically, first, an organic polymer film of polyimide, for example, is deposited over a substrate on which electrodes for use to apply a voltage to the liquid crystal layer and circuit components (such as switching elements and lines) for supplying a predetermined voltage to the electrodes are provided. Next, the surface of this organic polymer film is mechanically rubbed directly with a cloth in a predetermined direction (subjected to a rubbing treatment), thereby obtaining an alignment film having the function of aligning the liquid crystal molecules in the predetermined direction.

It is believed that the alignment film should define the orientation direction of the liquid crystal molecules due to the shape effects of fine grooves that have been formed on the surface of the film as a result of the rubbing treatment, the stretching effects of organic polymers that make up the film, and the anisotropic electrostatic effects induced on the surface of the film.

However, if the liquid crystal molecules are aligned by the conventional rubbing treatment, then fibers of the cloth and impurities such as debris and dust may be deposited on the surface of the film or on the substrate, thus possibly causing some defects or deterioration on the display and decreasing the yield or reliability. Also, the static electricity, produced during the rubbing treatment, may cause a dielectric breakdown in thin-film transistors (TFTs) or metal-insulator-metal (MIM) elements, thus also bringing about some defects in the display. Furthermore, in the rubbing treatment, the pressure cannot always be applied sufficiently uniformly but may be applied locally non-uniformly. As a result, the liquid crystal molecules may have their pretilt angles disturbed to form some rubbing stripes in very small domains of the liquid crystal layer. In that case, the display quality may be seriously affected.

Furthermore, the rubbing treatment is preferably carried out in an environment that is as free from static electricity or dust as possible. Thus, in the actual production line, the rubbing treatment needs to be performed separately from the place where the process step of forming the organic polymer film is being carried out. In addition, after the rubbing treatment process has been carried out, the substrate needs to be subjected to a wet cleaning process step, which requires a huge quantity of cleaning liquid. Consequently, the conventional rubbing treatment significantly increases the number of required process steps and the cost of the LCD panel manufacturing process.

Thus, to overcome these problems, various non-contact alignment treatment techniques have been proposed. A method of forming an alignment film by exposing an organic polymer film, including photosensitive molecules, to a polarized ultraviolet ray is disclosed in Japanese Patent No. 2608661 and Japanese Laid-Open Publication No. 9-197406, for example.

Also, a so-called "optical alignment technique" of controlling the pretilt angle to be defined by a polyimide film for liquid crystal molecules by obliquely irradiating the polyimide film with a (non-polarized or polarized) ultraviolet ray is disclosed in Mol. Cryst. Liq. Cryst. Sci. Technol., Sect. A, 333, 165 (1999).

Furthermore, techniques of forming an alignment film by irradiating an alignment film with another energy beam such as an electron beam, an ion beam or a laser beam onto the surface of a target film unlike the optical alignment technique described above are disclosed in Japanese Laid-Open Publications No. 2-222927, No. 6-130391, No. 7-56172, and No. 9-218409, for example.

In any of these alternative techniques, when exposed to the energy beam, the surface of the alignment film is physically etched anisotropically, thereby forming a great number of fine grooves. Thus, the liquid crystal molecules are believed to be aligned anisotropically along those grooves. According to these energy beam methods, however, some damage is also done on the material of the film being exposed to the energy beam. Accordingly, alignment defects may be formed or the reliability may decrease. For that reason, it is difficult to optimize the energy beam irradiation conditions.

Japanese Laid-Open Publication No. 11-271773 discloses a method of arranging the atomic structures of an alignment film in a desired direction by exposing a film, which has been formed on a substrate by a dry patterning process (e.g., an evaporation process, a sputtering process, an ion beam deposition process, a CVD process or a PECVD process), to a particle beam. In this method, the material of the alignment film must be optically transparent and amorphous or fine particular. Examples of specific alignment film materials disclosed therein include glass, graphite, diamond, SiC, $SiO_2$, $Si_3N_4$, $Al_2O_3$, $SnO_2$, $InTiO_2$, $InZnO_2$ and $ZnTiO_2$. On the other hand, Japanese Laid-Open Publication No. 11-271774 discloses a technique of aligning liquid crystal molecules in which a film, producing bonds to be aligned on the surface preferentially, is formed and the surface thereof is exposed to (the impact of) a particle beam consisting of atoms, molecules, ions or clusters, thereby producing bonds that are aligned in a direction preferentially and anisotropically. Examples of specific alignment film materials disclosed therein include graphite, diamond, SiC, $SiO_2$, $Si_3N_4$, $Al_2O_3$, $SnO_2$, $InTiO_2$, $InZnO_2$ and $ZnTiO_2$.

In the techniques disclosed in Japanese Laid-Open Publications No. 11-271773 and No. 11-271774, however, a film having a basically isotropic structure is exposed to a particle beam, thereby producing a preferential alignment for the atomic arrangements or bonds and aligning the liquid crystal molecules by utilizing the anisotropy. Thus, according to these techniques, the anchoring force is relatively weak and good reliability may not be achieved. Also, although Japanese Laid-Open Publication No. 11-271774 describes that a crystalline or polycrystalline material may contribute to forming the alignment film either indirectly or directly, the publication provides no specific disclosure about that.

Furthermore, Japanese Laid-Open Publications No. 2-294618 and No. 2001-21891 disclose a technique of adding an alignment film function to conductive films that are used to apply a voltage to a liquid crystal layer. Specifically, Japanese Laid-Open Publication No. 2-294618 discloses that transparent conductive films of ITO, which sandwich the liquid crystal layer, may have anchoring force when formed by an oblique evaporation process. On the other hand, Japanese Laid-Open Publication No. 2001-21891 discloses a method of providing anisotropy for conductive films by exposing the surface of electrodes made of an inorganic material such as ITO, Al or an Al alloy to an energy beam directly and thereby etching the surface of the electrodes anisotropically.

However, the conventional conductive film is normally an amorphous film or a polycrystalline film with random crystallographic orientations. Thus, it is difficult to maintain sufficient anchoring force, contributing to aligning the orientation directions of liquid crystal molecules constantly, with good reproducibility just by carrying out the oblique evaporation process as disclosed in Japanese Laid-Open Publication No. 2-294618 or by patterning the surface of the conductive films into an anisotropic shape (e.g., steps or grooves) by an anisotropic etching process as disclosed in Japanese Laid-Open Publication No. 2001-21891. In an active-matrix-addressed liquid crystal display device, in particular, the orientation directions of liquid crystal molecules are often disturbed near steps that are created by the complicated stacking structure. Accordingly, to make a commercially viable product, the anchoring force thereof must be increased.

SUMMARY OF THE INVENTION

In order to overcome the problems described above, preferred embodiments of the present invention provide a highly reliable liquid crystal display device, which can be fabricated by a simplified manufacturing process that needs no rubbing treatment to make an alignment film, and a method for fabricating such a liquid crystal display device.

A liquid crystal display device according to a preferred embodiment of the present invention preferably includes: a liquid crystal layer; a pair of electrodes for use to apply a voltage to the liquid crystal layer; and at least one inorganic alignment film. The inorganic alignment film preferably makes direct contact with the liquid crystal layer and is preferably made of a crystalline conductive film where crystal grains are oriented in a predetermined direction preferentially.

In one preferred embodiment of the present invention, the at least one inorganic alignment film preferably functions as at least a portion of the pair of electrodes.

In another preferred embodiment, the crystalline conductive film preferably has a groove, which extends in a direction associated with the predetermined direction and which faces the liquid crystal layer.

In still another preferred embodiment, the crystalline conductive film is preferably made of indium tin oxide, Al or an Al alloy.

In yet another preferred embodiment, the crystalline conductive film preferably has a degree of crystallinity of at least about 60%.

In yet another preferred embodiment, the crystal grains preferably have a cubic crystalline structure, and the predetermined direction may be <111> directions of the crystal grains.

In this particular preferred embodiment, the crystalline conductive film preferably has a diffraction intensity ratio of about 0.25 or less in an X-ray diffraction pattern. The diffraction intensity ratio is preferably defined by $I(400)/I(222) \equiv Ip$, where $I(400)$ represents a peak intensity of a (400) plane and $I(222)$ represents a peak intensity of a (222) plane.

In an alternative preferred embodiment, the crystal grains preferably have a cubic crystalline structure, and the predetermined direction may be <110> directions of the crystal grains.

In yet another preferred embodiment, the crystalline conductive film is preferably made of indium tin oxide and preferably exhibits a transmittance of about 70% or more with respect to a light ray having a wavelength of about 400 nm and a transmittance of about 80% or more with respect to a light ray having a wavelength of about 550 nm when the thickness of the crystalline conductive film is 120 nm.

In yet another preferred embodiment, the device preferably further includes: an illumination optical system for illuminating the liquid crystal layer with light; and a projection optical system for projecting the light that has been transmitted through the liquid crystal layer.

A method for fabricating a liquid crystal display device according to a preferred embodiment of the present invention is preferably designed to make a liquid crystal display device including: a liquid crystal layer; a pair of electrodes for use to apply a voltage to the liquid crystal layer; and at least one inorganic alignment film, which makes direct contact with the liquid crystal layer and which is made of a crystalline conductive film. The method preferably includes the steps of: forming the crystalline conductive film, in which crystal grains are oriented in a predetermined direction preferentially, on a substrate; and forming the liquid crystal layer on the crystalline conductive film.

In one preferred embodiment of the present invention, the method preferably further includes the step of irradiating the crystalline conductive film with an energy beam at an angle that is associated with the predetermined direction.

In this particular preferred embodiment, the step of forming the crystalline conductive film preferably includes the step of forming the crystalline conductive film in which the crystal grains have a cubic crystalline structure and are oriented in <111> directions thereof. The step of irradiating the crystalline conductive film with the energy beam preferably includes the step of irradiating the crystalline conductive film such that the energy beam defines an angle of incidence of about 30 degrees to about 50 degrees with respect to a normal to the surface of the substrate.

In an alternative preferred embodiment, the step of forming the crystalline conductive film preferably includes the step of forming the crystalline conductive film in which the crystal grains have a cubic crystalline structure and are oriented in <110> directions thereof. The step of irradiating the crystalline conductive film with the energy beam preferably includes the step of irradiating the crystalline conductive film such that the energy beam defines an angle of incidence of about 35 degrees to about 55 degrees with respect to a normal to the surface of the substrate.

In yet another preferred embodiment, the step of irradiating the crystalline conductive film with the energy beam preferably includes the step of irradiating the crystalline conductive film with at least one energy beam that is selected from the group consisting of an excimer laser beam, an ultraviolet ray, an electron beam and a particle beam.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, the structures and functions of a liquid crystal display device according to preferred embodiments of the present invention will be described with reference to the accompanying drawings.

Figure 1:
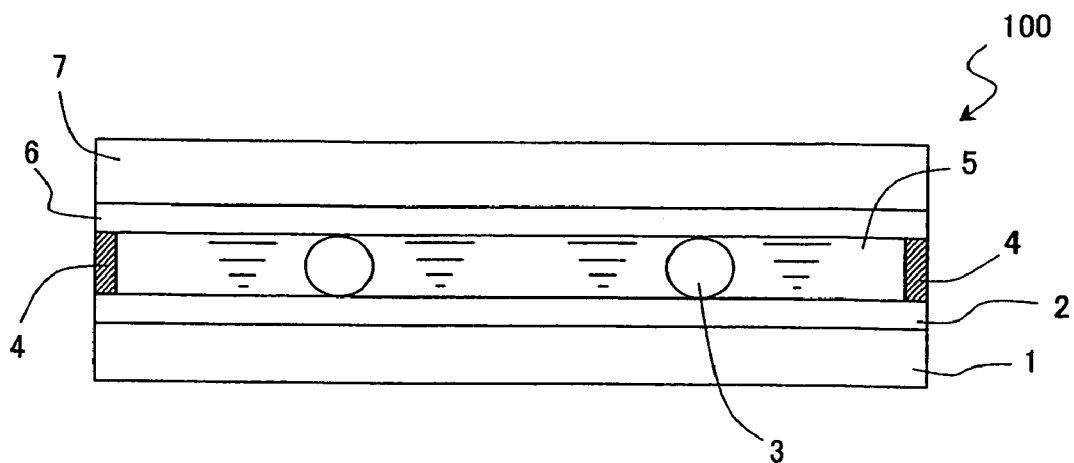
FIG. 1 is a cross-sectional view schematically illustrating the structure of a liquid crystal display device 100 according to a preferred embodiment of the present invention.

FIG. 1 is a schematic cross-sectional view illustrating a structure for a liquid crystal display device 100 according to a preferred embodiment of the present invention. As shown in FIG. 1, the liquid crystal display device 100 preferably includes a liquid crystal layer 5, and a pair of electrodes 2 and 6 for use to apply a voltage to the liquid crystal layer 5. Each of these electrodes 2 and 6 may also function as an inorganic alignment film made of a crystalline conductive film where crystal grains are oriented in a predetermined direction preferentially. The liquid crystal layer 5 is provided in the gap created between a pair of substrates 1 and 7 by spacers 3, and is sealed with a seal member 4. The electrodes 2 and 6 are provided on the substrates 1 and 7, respectively, so as to face the liquid crystal layer 5, and are used to apply a voltage that regulates the optical orientation states of the liquid crystal layer 5. In an active-matrix-addressed liquid crystal display device, the electrodes 2 and 6 may be a pixel electrode and a counter electrode, respectively. In that case, each pixel will include both of these electrodes 2 and 6.

The liquid crystal display device 100 shown in FIG. 1 uses inorganic alignment films, made of crystalline conductive films, as the electrodes 2 and 6. However, depending on the orientation mode of the liquid crystal layer 5, the inorganic alignment film may be provided on just one of the two substrates 1 and 7 so as to face the liquid crystal layer 5. As another alternative, the inorganic alignment films may be provided separately from the electrodes 2 and 6. As used herein, the "inorganic alignment film" may be any of various non-organic alignment films and may be made of a metal, a metal oxide or a metal nitride, for example.

The liquid crystal display device 100 of this preferred embodiment includes inorganic alignment films (also functioning as the electrodes 2 and 6 in FIG. 1) made of crystalline conductive films in which crystal grains are oriented in a predetermined direction preferentially. Accordingly, those crystalline conductive films, including the aligned crystal grains, may be formed by any of various methods, and do not have to be subjected to any rubbing treatment unlike the conventional organic polymer alignment film. These inorganic alignment films have electrical conductivity and can be used as the electrodes 2 and 6 as already described above. It should be noted, however, that if the electrodes for use to apply a voltage to the liquid crystal layer cannot be used as alignment films (e.g., in IPS mode), then inorganic alignment films may be provided independent of the electrodes. Even so, those additional inorganic alignment films can also be formed by the process step of forming the electrodes or lines that are connected to the electrodes. Thus, the manufacturing process of the liquid crystal display device can also be simplified. As a result, the manufacturing cost of the liquid crystal display device can be reduced and the yield thereof can be increased.

In the liquid crystal layer 5, the liquid crystal molecules (not shown) are aligned in a direction that is associated with the preferential orientation direction of the crystal grains in the crystalline conductive films. In addition, the crystalline conductive films can impose stronger anchoring force than the alignment films described in Japanese Laid-Open Publication Nos. 11-271773 and 11-271774, and can maintain a stabilized orientation state in the liquid crystal layer 5.

Also, the surface of the crystalline conductive films is preferably provided with physical anisotropy by irradiating the crystalline conductive films with an energy beam from the direction that is associated with the preferential orientation direction of the crystal grains in the crystalline conductive films. Then, the crystalline conductive films can exhibit even stronger anchoring force, thus further increasing the uniformity and stability of the orientation state of the liquid crystal layer. Furthermore, the crystalline conductive films are made of an inorganic material, and are much less damaged than the conventional organic alignment films even when exposed to an energy beam. Accordingly, there is no need to worry about the unwanted decrease in reliability, which is often the case with the conventional organic alignment films. Examples of preferred energy beams include particle beams (consisting of atoms, molecules, ions or clusters) as disclosed in Japanese Laid-Open Publications Nos. 11-271773 and 11-271774 and various other energy beams (including an excimer laser beam, an ultraviolet ray and an electron beam) as disclosed in Japanese Laid-Open Publication No. 2001-21891.

As used herein, the "direction that is associated with the preferential orientation direction of crystal grains" is a direction that satisfies a predetermined relationship with the preferential orientation direction of the crystal grains. The "predetermined relationship", in turn, depends on the crystallographic system (or crystal structure) of the crystal grains. The orientation direction of the liquid crystal molecules, which is controlled by the inorganic alignment films (i.e., the crystalline conductive films), is not always identical to (or parallel to) the preferential orientation direction of the crystal grains. However, the orientation direction of the liquid crystal molecules is determined according to the crystallographic system of the crystal grains and is associated with the preferential orientation direction of the crystal grains. Also, by radiating the energy beam from a direction that satisfies a certain relationship with the preferential orientation direction of the crystal grains, the anchoring force can be increased in the direction that is associated with the preferential orientation direction of the crystal grains. Thus, the energy beam irradiating direction is also determined according to the crystallographic system of the crystal grains.

When the crystalline conductive films are exposed to an energy beam, the anchoring force thereof is believed to be increased by the following two mechanisms (1) and (2) in combination. The degrees of contribution of these two mechanisms are changeable with the type of the energy beam and the material of the crystalline conductive films.

(1) When exposed to an energy beam from a certain direction, the crystalline conductive films are etched anisotropically to define a groove structure, which extends in a predetermined direction that is associated with the preferential orientation direction thereof. Due to a grating effect (shape effect) caused by this groove structure, the orientation directions of the liquid crystal molecules are controlled.

(2) With the energy beam incident from a certain direction on the crystalline conductive films, bonds in a particular direction (e.g., a direction that is perpendicular to, or intersects with, the orientation direction of the crystal grains) may be either selectively cut off or newly produced, thus increasing the anisotropy of bonds existing around the surface of the crystalline conductive films and increasing the anchoring force.

In the liquid crystal display device 100 of this preferred embodiment, the electrodes 2 and 6 for use to apply a voltage to the liquid crystal layer 5 also function as inorganic alignment films. Compared to the arrangement in which electrically insulating, organic alignment films are provided on the electrodes 2 and 6 so as to face the liquid crystal layer 5, the arrangement shown in FIG. 1 can achieve the following advantages (1) through (3):

(1) The transmittance of the display panel does not decrease due to the absorption of light into the alignment films.

(2) An image persistence (image sticking) phenomenon, caused by polarized charges remaining in the interfaces between the electrically insulating alignment films and the liquid crystal layer, and other unwanted phenomena can be avoided.

(3) The display quality is not affected by the thermally or optically induced deterioration of the organic alignment films.

Hereinafter, the structure of the crystalline conductive films to be used as the inorganic alignment films in the liquid crystal display device according to this preferred embodiment of the present invention and a method for forming the crystalline conductive films will be described in further detail.

How to Form Crystalline Conductive Films

Figure 2:
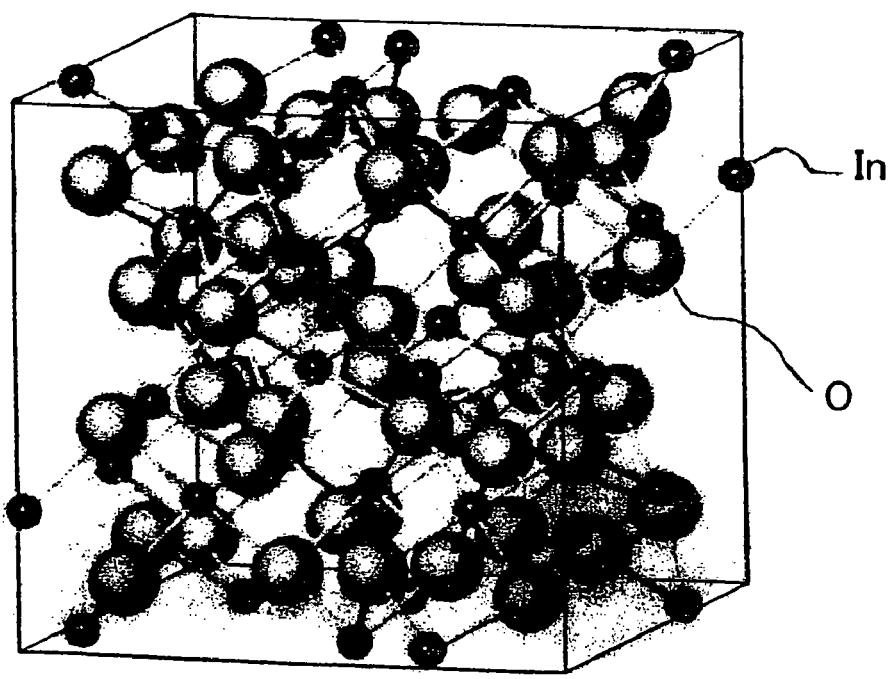
FIG. 2 schematically illustrates the crystal structure of indium oxide.

In a liquid crystal display device, a film of indium tin oxide (ITO) is normally used as a material for the transparent electrodes thereof. The ITO film is an aggregate of ITO particles and may or may not exhibit crystallinity, which is controllable by adjusting the conditions to deposit the film, for example. According to a report, indium oxide ($In_2O_3$) has two crystallographic systems of cubic $In_2O_3$ [I] and hexagonal $In_2O_3$ [II]. In a low-temperature film synthesis process to be carried out at a normal or lower pressure, the cubic $In_2O_3$ [I], which is called "bixbyite" belonging to a space group $I_{a3}$) as schematically shown in FIG. 2, is prevailing. The crystalline conductive films for use in the liquid crystal display device according to this preferred embodiment are preferably made of ITO films having the cubic crystal structure.

An ITO film in which crystal grains are oriented in a particular direction preferentially may be formed by a high-density plasma-assisted EB evaporation (HDPE) process, which is a low-temperature deposition process by an activating evaporation technique as described in Oyo Buturi, Vol. 64, No. 12, pp. 1225–1229 (1995). Examples of other preferred processes include physical deposition processes such as vacuum evaporation, ion plating and sputtering processes and a chemical vapor deposition (CVD) process. In particular, when the HDPE process is adopted, a crystalline ITO film with a relatively low resistivity (e.g., about $2\times10^{-4}$ Ω·cm or less) can be formed at a relatively low temperature (e.g., at a substrate temperature of about 150° C. to about 200° C.).

Figure 3:
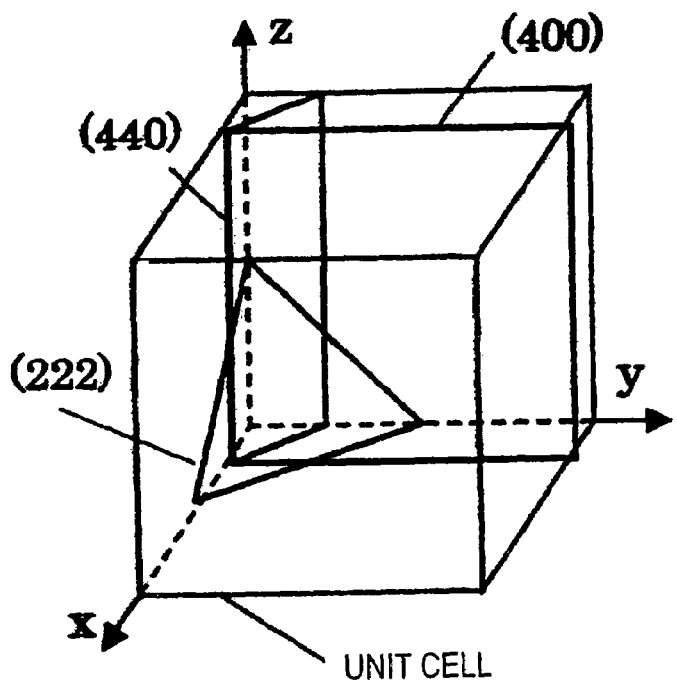
FIG. 3 schematically shows the crystallographic planes of a cubic crystal unit cell (or crystal lattice).
Figure 4:
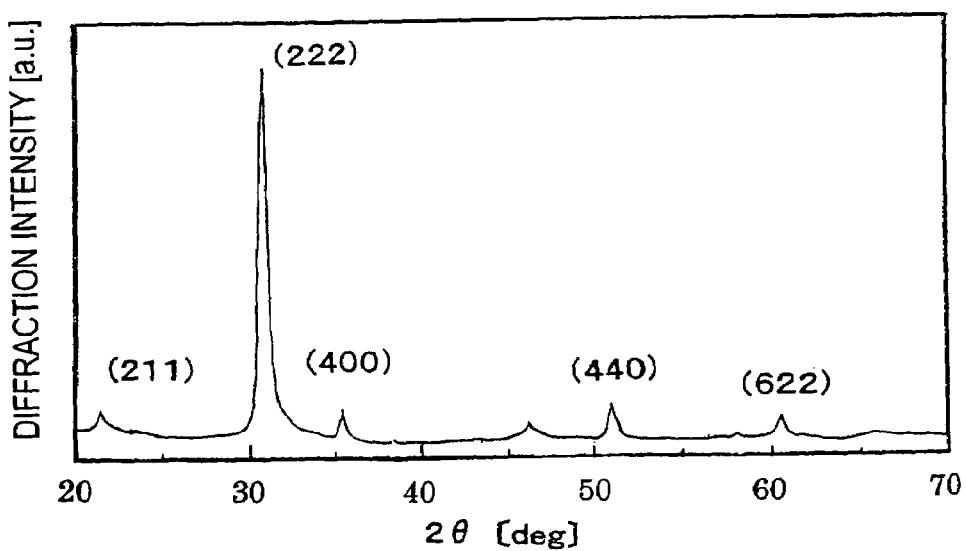
FIG. 4 shows the XRD pattern of a crystalline ITO film for use in a liquid crystal display device according to a preferred embodiment of the present invention and the crystallographic planes represented by the respective peaks of diffraction.

The crystal structure and the degree of crystallinity of the ITO film can be identified and estimated by analyzing the X-ray diffraction (XRD) pattern thereof (e.g., by locating crystal peaks resulting from the indium oxide component). When a crystalline ITO film is subjected to a thin film XRD analysis, peaks representing (222), (400), (211), (440) and (622) planes that mainly result from indium oxide are detected. FIG. 3 schematically shows the crystallographic planes of a cubic crystal unit cell (or crystal lattice). FIG. 4 shows the XRD pattern of a preferred crystalline ITO film and crystallographic planes represented by the respective peaks of diffraction.

As for the orientation directions of the crystal grains in the crystalline ITO film, the preferential orientation direction may be determined by the ratio of the peak intensity of the (400) plane to that of the (222) plane among the diffraction peaks shown in FIG. 4. More specifically, the preferential orientation direction may be estimated quantitatively by the following XRD peak intensity ratio:

$$I(400)/I(222)=Ip$$

where I(400) represents the peak intensity of the (400) plane and I(222) represents the peak intensity of the (222) plane. If the Ip value is less than about 0.33, then <111> orientation directions may be regarded as the preferential orientation direction. On the other hand, if the Ip value is equal to or greater than about 0.33, then <100> orientation directions may be regarded as the preferential orientation directions. In the same way, it is also possible to determine, by the ratio of the peak intensity of the (440) plane to that of the (400) plane, whether the <110> orientation directions are preferential or not. It should be noted that according to crystal diffraction data values (i.e., ASTM values), the peak intensity ratio Ip is about 0.33 when crystal grains of indium oxide are randomly oriented.

The crystalline ITO films for use in the liquid crystal display device of this preferred embodiment preferably have an Ip value of less than about 0.33 (i.e., either the <111> orientation directions or the <110> orientation directions are preferably preferential) and more preferably have an Ip value of about 0.25 or less. The reason is as follows. Specifically, in an ITO film with an Ip value of about 0.25 or less, the <111> orientation is even more dominating, and therefore, the orientation directions are much less disturbed on the grain boundary and sub-grains are oriented in substantially the same direction in the crystal grains. Thus, such an ITO film can impose orientation control on the liquid crystal molecules more uniformly. The crystal grains typically have an average grain size of about 250 nm or more. In that case, each of those crystal grains preferably consists of sub-grains with an average grain size of about 20 nm to about 70 nm.

Furthermore, the crystalline conductive films preferably have a degree of crystallinity of at least about 60%, more preferably about 90% or more. The "degree of crystallinity" is herein estimated by the peak intensities of an XRD pattern. More specifically, the degree of crystallinity is calculated as the percentage of the sum of XRD peak intensities resulting from crystalline portions to the integral of the peak intensities resulting from not only the crystalline portions but also non-crystalline portions. If a crystalline conductive film has a degree of crystallinity of less than about 60%, then the crystalline conductive film cannot impose sufficient orientation control on liquid crystal molecules and may be unable to function as an alignment film appropriately.

It is known that the electrical properties of an ITO film are closely correlated with various factors including impurities, crystallographic defects such as oxygen defects and lattice defects, and grain boundaries. Generally speaking, a crystalline ITO film tends to have a lower resistivity than an amorphous ITO film. Also, the higher the degree of crystallinity of an ITO film, the lower the resistivity thereof tends to be.

To obtain a sufficiently high display brightness in a transmission type display device, the crystalline conductive films preferably exhibit a transmittance of about 70% or more with respect to a light ray having a wavelength of about 400 nm and a transmittance of about 80% or more with respect to a light ray having a wavelength of about 550 nm when the thickness of the crystalline conductive films is 120 nm.

The liquid crystal display device 100 of the preferred embodiment described above is a transmission type display device that uses crystalline ITO films (i.e., transparent conductive films) as the electrodes 2 and 6 thereof. However, the present invention is also applicable for use in a reflection type liquid crystal display device or in a transflective (i.e., transmission/reflection) type liquid crystal display device. In those alternative liquid crystal display devices, the crystalline conductive films are preferably made of an Al film or an Al alloy film. This is because Al normally defines a face centered cubic lattice crystal structure and an Al film can function as an alignment film basically in the same way as the ITO film described above.

Alignment Treatment by Energy Beam

As described above, the crystalline conductive films in which the crystal grains are oriented in a particular orientation direction preferentially can function as alignment films just as intended without being subjected to any rubbing treatment. However, the anchoring force of the crystalline conductive films can be further increased by subjecting the crystalline conductive films to an alignment treatment as will be described below.

To increase their anchoring force, the crystalline conductive films may be subjected to such an alignment treatment by being directly exposed to an energy beam. Examples of such energy beams for use in this preferred embodiment of the present invention include an excimer laser beam, an ultraviolet ray, an electron beam, and a particle beam consisting of ions, atoms, molecules or clusters thereof, one of which may be used by itself or some of which may be combined together.

For example, when an excimer laser beam is used as an energy beam, the surface of the crystalline conductive films can be etched anisotropically by utilizing the annealing phenomenon or the physical ablation (i.e., substance removing) action of the laser beam. Also, when the crystalline conductive films are exposed to an ultraviolet ray, bonding sites, having smaller bonding energy than the energy of the ultraviolet ray, are selectively excited, cleaved and collapsed, thus producing an anisotropic etching action, too. Furthermore, when exposed to an electron beam, the surface of the crystalline conductive films is subject to physical actions (e.g., melted and vaporized) due to the thermal action of the electron beam, thus also achieving anisotropic etching. Furthermore, when exposed to an ion beam, the crystalline conductive films are subject to a sputtering action caused by the collision of ions onto the surface of the crystalline conductive films, thus also achieving anisotropic etching. By controlling the operation of irradiation of any of these energy beams onto a target area on the surface of the crystalline conductive films, a groove structure can be defined on that surface area. This alignment treatment using such an energy beam is naturally a non-contact treatment on the crystalline conductive films.

It should be noted that if the crystalline conductive films are exposed to an electrically charged energy beam (e.g., an ion beam, in particular), then the charges on the crystalline conductive films are preferably neutralized or removed while the films are being exposed to the energy beam or just after the films have been exposed to the energy beam. If the crystalline conductive films are exposed to a positively charged ion beam, then electrons are preferably supplied onto the surface of the crystalline conductive films to neutralize positive charges on the films during the ion beam irradiation.

The effects of increasing the anchoring force of the crystalline conductive films by exposing the films to an energy beam are not necessarily shape effects (or grating effects) to be achieved by defining grooves by the anisotropic etching process described above. Alternatively, by exposing the crystalline conductive films to an energy beam, bonds may also be selectively cut off or newly produced around the surface of the crystalline conductive films, and anisotropy may be produced for the bonds existing around the surface of the crystalline conductive films. Then, the liquid crystal molecules can also be aligned in a particular orientation direction by utilizing such anisotropic bonding. To create such anisotropic bonding, the crystalline conductive films are preferably exposed to a particle beam as disclosed in Japanese Laid-Open Publications Nos. 11-271773 and 11-271774, for example.

To increase the anchoring force of the crystalline conductive films by directly exposing the crystalline conductive films to an energy beam as described above, the crystalline conductive film are preferably irradiated with the energy beam coming from a direction that defines a predetermined tilt angle with respect to a normal to the surface of the crystalline conductive film (which is typically parallel to the surface of the substrate).

Particularly when the anchoring force of the crystalline conductive films is increased by utilizing the shape effects to be achieved when a fine groove structure is defined on the surface of the crystalline conductive films by the exposure to the energy beam, a huge number of fine grooves, extending in parallel to the preferential orientation direction of the crystalline conductive films, are preferably defined. To form such grooves, the energy beam preferably comes from a direction that is defined by a plane including a normal to the surface of the crystalline conductive films and the preferential orientation direction and that defines a predetermined tilt angle with respect to the normal. When the energy beam comes from such a direction (such an irradiation will be sometimes referred to herein as "oblique irradiation parallel to the preferential orientation direction"), bonding components, which are oriented substantially perpendicularly to the direction in which the energy beam travels, are broken and collapsed preferentially (or selectively). As a result, a groove structure, extending parallel to the preferential orientation direction of the crystal grains, can be formed efficiently.

When the energy beam is incident obliquely in a preferred embodiment of the present invention, a preferred energy beam irradiation direction, which should be associated with the orientation direction of the crystal grains, is substantially perpendicular to the crystallographic planes that define the preferential orientation direction.

For example, if the crystalline conductive films have a crystal structure including crystal grains that are oriented in <111> directions preferentially, then the crystalline conductive films are preferably irradiated with the energy beam so as to define an angle of incidence of about 30 degrees to about 50 degrees with respect to the normal to the surface of the crystalline conductive films. On the other hand, if the crystalline conductive films have a crystal structure including crystal grains that are oriented in <110> directions preferentially, then the crystalline conductive films are preferably irradiated with the energy beam so as to define an angle of incidence of about 35 degrees to about 55 degrees with respect to the normal to the surface of the crystalline conductive films. When the crystal grains are oriented in the <111> directions preferentially, the crystalline conductive films are more preferably irradiated with the energy beam so as to define an angle of incidence of about 30 degrees to about 40 degrees. On the other hand, when the crystal grains are oriented in the <110> directions preferentially, the crystalline conductive films are more preferably irradiated with the energy beam so as to define an angle of incidence of about 40 degrees to about 50 degrees. In this case, if the angle of incidence of the energy beam falls outside of these preferred ranges, then the bonding components, which are oriented substantially perpendicular to the direction in which the energy beam travels, are much more likely to be cut off. Thus, bonding components that are oriented parallel to the preferential orientation direction of the crystal grains are broken in great numbers. As a result, the effects of increasing the anchoring force diminish.

Figure 5:
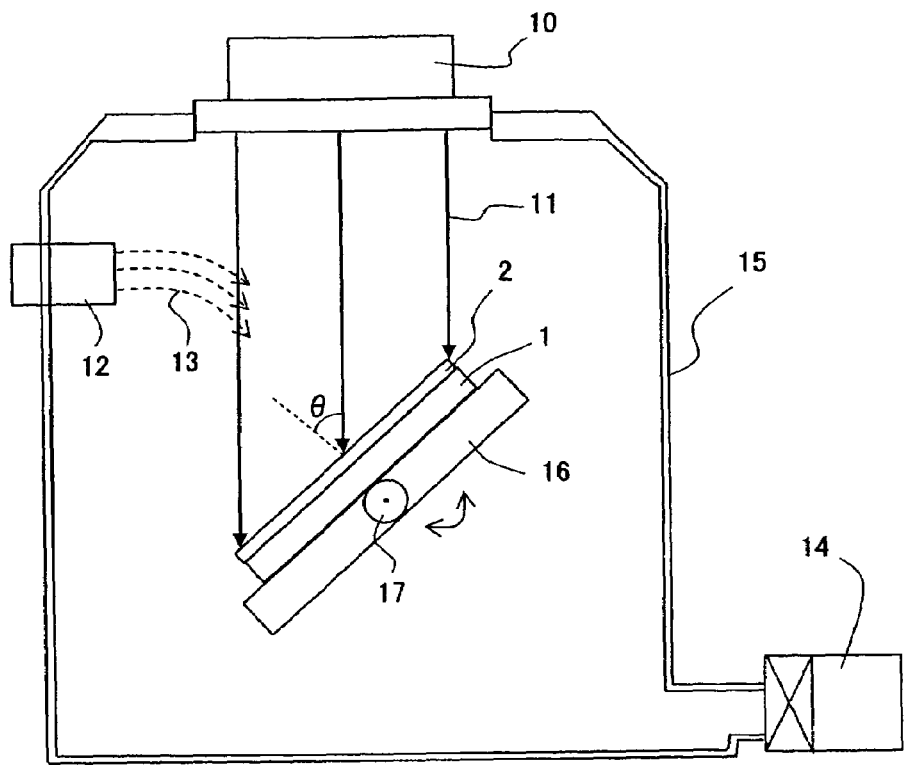
FIG. 5 schematically illustrates a configuration for an ion beam emitter 10 which is preferably used to carry out an alignment treatment on a crystalline conductive film in a preferred embodiment of the present invention.

FIG. 5 schematically illustrates an exemplary configuration for an ion beam emitter for use in the alignment treatment of the crystalline conductive films in this preferred embodiment.

As shown in FIG. 5, the ion beam emitter preferably includes an ion beam source 10 from which an ion beam 11 is emitted and an electron source 12 from which electrons are emitted to neutralize the electric charges that have been created by the ion beam 11. In a vacuum chamber 15, which is evacuated by a vacuum pump 14 to create and maintain a reduced pressure atmosphere therein, a stage 16 is preferably provided so as to freely rotate around a shaft 17. The substrate 1 including the crystalline conductive film (i.e., electrode) 2 (see FIG. 1) thereon is mounted on the stage 16 and the angle θ of incidence of the ion beam 11 is adjusted with respect to the crystalline conductive film 2. To neutralize electric charges, which are produced on the surface of the crystalline conductive film 2 being exposed to the ion beam 11, the crystalline conductive film 2 is exposed to an electron shower 13 while the film 2 is being exposed to the ion beam 11 or just after the film 2 has been exposed to the ion beam 11. Optionally, the crystalline conductive film 2 may be exposed to the ion beam 11 and the electron shower 13 simultaneously or alternately a number of times.

The crystalline conductive film 2 is made of an inorganic material as described above. Accordingly, compared to using an organic material, the inner walls of the chamber 15 and the surface of the crystalline conductive film 2 are much less likely to be contaminated. Also, the surface of the substrate 1 is mostly covered with the crystalline conductive film 2 and no electrons will remain there locally. Thus, no active components such as TFTs will cause dielectric breakdown due to static electricity.

An ion beam emitter is illustrated as an exemplary energy beam emitter in FIG. 5. Alternatively, as disclosed in Japanese Laid-Open Publication No. 9-218409, an apparatus for irradiation of an ion beam and an ultraviolet ray may also be used. Also, any other energy beam emitter may be formed by a known technique (e.g., by changing the beam sources).

Analysis of Crystalline Conductive Film

The crystalline conductive films formed as described above may be analyzed in the following manner, for example. Hereinafter, an analysis method that will be used in specific examples of preferred embodiments of the present invention and comparative examples will be described.

(1) Analysis of Crystallinity and Crystal Orientation Direction

A thin film XRD analyzer RINTI 500 (produced by Rigaku International Corporation) was used to measure the diffraction intensities under the conditions including a Cu tube (CuK α1 line), a tube current of about 200 mA, a tube voltage of about 50 kV, a broad-angle goniometer, a sampling angle of about 0.05 degrees, a scanning rate of about 3.0 degrees per minute, a scanning axis of 2 θ, a fixed angle of about 1.0 degree and a rotational velocity of about 120 rpm. The degree of crystallinity and crystallinity were evaluated based on the shapes of respective diffraction peaks and the integrated intensities.

As for the crystalline ITO film, for example, a diffraction peak representing the (222) plane could be detected when 2 θ≈30.5 degrees, a diffraction peak representing the (400) plane could be detected when 2 θ≈35.4 degrees, and a diffraction peak representing the (440) plane could be detected when 2 θ≈51.0 degrees as shown in FIG. 4. Thus, the orientation directions of the crystal grains were defined based on the ratio of these peak intensities.

(2) Analysis of Crystal Grain Sizes

The two-dimensional distances of the crystal grains were analyzed by observing the surface of the crystalline conductive film directly (i.e., without depositing Au thereon) and perpendicularly to the surface of the film using a field emission secondary electron microscope S-900 (produced by Hitachi, Ltd). The magnification of the microscope was set to $10^5$, for example.

(3) Surface Observation After Alignment Treatment

The surface shapes of the crystalline conductive film before and after the anisotropic etching process were observed by using an atomic force microscope SPI 3700 (produced by Seiko Instruments Inc.) in a resonance mode at a scanning frequency of about 1 Hz. The area under measurement was about 1 μm square.

(4) Measurement of Spectral Transmittance

The spectral transmittance of the crystalline conductive film was measured in a transmission mode with a spectrophotometer U-4100 (produced by Hitachi, Ltd.) by reference to the spectral transmittance in the air. The transmittance of the crystalline conductive film was measured with the thickness thereof converted. Specifically, with the thickness of the crystalline conductive film is 120 nm, the transmittances thereof with respect to incoming light rays having wavelengths of about 400 nm and about 550 nm were measured.

Liquid Crystal Display Device

A liquid crystal display device according to a preferred embodiment of the present invention includes an inorganic alignment film made of the crystalline conductive film described above. Thus, the liquid crystal display device needs no rubbing treatment to make the alignment film and ensures excellent heat resistance, light resistance and moisture resistance. For that reason, the present invention is particularly effectively applicable for use in a projection type liquid crystal display device in which the LCD panel is exposed to intense light and often has an elevated temperature.

Figure 6:
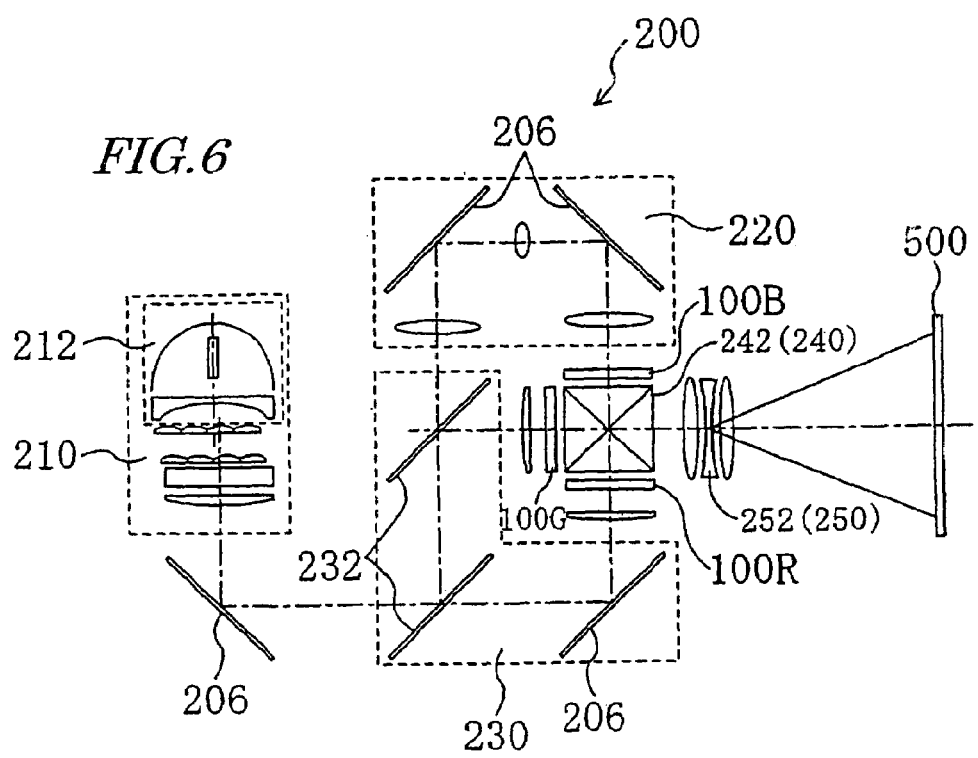
FIG. 6 schematically illustrates an exemplary arrangement for a projection type liquid crystal display device 200 according to a specific preferred embodiment of the present invention.

FIG. 6 schematically illustrates an exemplary arrangement for a projection type liquid crystal display device (which will be referred to herein as a "projector" simply) according to a preferred embodiment of the present invention.

As shown in FIG. 6, the projector 200 preferably includes an illumination optical system 210 including a lamp light source 212, a color separation optical system 230, a relay optical system 220, three liquid crystal panels (light bulbs) 100R, 100G and 100B, a crossed dichroic prism 242 and a projection lens 252. The liquid crystal light bulbs 100R, 100G and 100B are arranged in the optical paths of three light rays representing the three primary colors of red, green and blue (which will be referred to herein as an "R light ray", a "G light ray" and a "B light ray"), respectively. The light, which has been emitted from the illumination optical system 210, is separated by the color separation optical system 230 into the R, G and B light rays. Then, the R, G and B light rays are incident onto their associated liquid crystal light bulbs 100R, 100G and 100B. Thereafter, those light rays, modulated by their associated light bulbs in accordance with the image information, leave the light bulbs so as to be synthesized together at the crossed dichroic prism 242. The synthesized light is then projected by the projection lens 252 onto a screen 500 to present an image in full colors there.

In the preferred embodiment illustrated in FIG. 6, the color separation optical system 230 separates the white light into the red (R), green (G) and blue (B) light rays. Alternatively, a color separation optical system for separating the white light into cyan, magenta and yellow light rays may also be used. As another alternative, a color separation optical system for separating the white light, emitted from the illumination optical system 210, into four or more light rays in mutually different colors may also be used.

The projector 200 of the preferred embodiment shown in FIG. 6 is a three-panel type that uses the three liquid crystal light bulbs 100R, 100G and 100B, the crossed dichroic prism 242 and dichroic mirrors 232 and reflective mirrors 206. Alternatively, the R, G and B light rays may also be synthesized together by using dichroic mirrors instead of the crossed dichroic prism 242.

It should be noted that the present invention is applicable for use in not just the three-panel projection type liquid crystal display device described above but also in a single panel projection type liquid crystal display device as well. For example, the present invention is also applicable for use in a device including a single color LCD panel in which micro-color filters for the three primary colors of red, green and blue are provided for respective pixels. As another alternative, a single monochrome LCD panel and an optical system for making light rays in the three primary colors incident onto respective pixels of the LCD panel (consisting of dichroic mirrors and a microlens array, for example) may also be used in combination.

Also, none of the arrangements described above has to be a front projection type device that projects an image from the projector disposed in front of the screen as shown in FIG. 6. Alternatively, any of those arrangements is also applicable for use in a rear projection type device that projects an image from behind the screen using reflective mirrors, for example.

On the LCD panels for use in this preferred embodiment, information is written by an active-matrix-addressing technique, for example. However, the present invention is not limited to this particular type of liquid crystal display device but may also be applicable for use in a liquid crystal display device of simple-matrix-addressing type, an optical addressing type or a thermal addressing type (using a laser beam).

Hereinafter, specific examples of preferred embodiments of the present invention and comparative examples will be described. It should be noted that the present invention is in no way limited to the following illustrative examples.

EXAMPLES NOS. 1 THROUGH 4 AND COMPARATIVE EXAMPLES NOS. 1 THROUGH 4

Crystalline ITO films to be display electrodes (i.e., pixel electrodes and counter electrode) were deposited on transparent glass substrates by the HDPE process described above. The HDPE process was carried out such that plasma created near the transparent glass substrates had a density of about $10^{13}$ ions/cm$^3$ to about $10^{14}$ ions/cm$^3$ and a potential of about +10 V to about +30 V. A sintered body of ITO including about 7.5 mass % of SnO$_2$ was used as a target. The atmosphere had a pressure of about $4 \times 10^{-2}$ Pa to about $6.7 \times 10^{-2}$ Pa.

In first and second specific examples of preferred embodiments of the present invention, the films were deposited and crystallized at a substrate temperature Ts of about 200° C. When necessary, the films deposited were annealed at a temperature of about 150° C. to about 300° C.

The results of the thin film XRD pattern analysis and scanning electron microscopy (SEM) described above revealed that the crystalline ITO films of the first and second specific examples had a degree of crystallinity of at least about 95%, an Ip value ($\equiv I(400)/I(222)$) of about 0.1 and crystal grains that were oriented in <111> directions preferentially.

In a third specific example of a preferred embodiment of the present invention, crystalline ITO films were formed by adjusting the deposition conditions and raising the substrate temperature Ts to about 250° C. As a result, crystalline ITO films, having a degree of crystallinity of about 90% and crystal grains that were oriented in <110> directions preferentially, were obtained.

In a fourth specific example of a preferred embodiment of the present invention, crystalline ITO films were deposited at a substrate temperature Ts of about 150° C. As a result, crystalline ITO films, having a degree of crystallinity of about 62%, an Ip value of about 0.24, and crystal grains that were oriented in <111> directions preferentially, were obtained.

On the other hand, in a first comparative example, non-crystalline ITO films were deposited by a conventional EB evaporation process. In a second comparative example, crystalline ITO films were deposited by the HDPE process at a substrate temperature Ts of about 140° C. As a result, crystalline ITO films, having a degree of crystallinity of about 57%, an Ip value of about 0.35 and crystal grains that were oriented in <100> directions preferentially, were obtained. In a third comparative example, crystalline ITO films were deposited by a sputtering process at a substrate temperature Ts of about 200° C. As a result, crystalline ITO films, having a degree of crystallinity of about 68%, an Ip value of about 0.25 and crystal grains that were oriented in <111> directions preferentially, were obtained. In a fourth comparative example, crystalline ITO films were formed as in the first specific example described above and then known alignment films of polyimide were deposited by a printing process.

Each of these crystalline ITO films was patterned into a predetermined shape to form a display electrode.

In the first, third and fourth specific examples of preferred embodiments of the present invention and the first through fourth comparative examples, the crystalline ITO films and polyimide films on the substrates were exposed to an Ar ion beam by using the ion beam emitter shown in FIG. 5. The angle θ of incidence of the ion beam was also associated with the pretilt angle of liquid crystal molecules, for example. In the crystal structure in which crystal grains were oriented in the <111> directions preferentially, the ion beam was incident on the substrates so as to define an angle θ of incidence of about 35 degrees to about 37 degrees with respect to a normal to the surface of the substrates. On the other hand, in the crystal structure in which crystal grains were oriented in the <110> directions preferentially, the ion beam was incident on the substrates so as to define an angle θ of incidence of about 45 degrees. The Ar ion beam was directly incident on the surface of the films on the substrates by accelerating an ionized Ar gas, which had been generated from an ion source, with an applied electric field of about 400 V within a vacuum. In this manner, the films were subjected to the alignment treatment.

Thereafter, the upper and lower substrates were bonded together with cell spacers (with a diameter of about 4 μm) and a seal member. In this case, the upper and lower substrates were arranged with respect to each other such that the direction in which treated portions of the film faced on one of two substrates was approximately perpendicular to the direction in which treated portions of the film faced on the other substrate. Subsequently, a predetermined liquid crystal material was injected into the gap between the substrates within a vacuum, and then the injection holes were sealed airtight, thereby obtaining TN-mode transmission type LCD panels.

The electrooptical characteristics of the LCD panels obtained in this manner were evaluated. Specifically, their transmittances to optically rotating light were measured with a polarizing microscope and the contrast ratios (CR) resulting from an applied voltage of about 5 V were also measured. In addition, the heat and light resistances thereof were further evaluated by a reliability/aging test using a UHP lamp at a temperature of about 80° C. and an illuminance of about 20,000,000 lx. The results are shown in the following Tables 1 and 2.

TABLE 1

|  | Alignment Films | Degree of Crystallization | Crystal Orientation Ip value | Transmittance (%, 120 nm) 400 nm | 550 nm | Ion Beam |
|---|---|---|---|---|---|---|
| Ex. 1 | Crystalline ITO | 95% | <111> Ip = 0.1 | 82 | 95 | Obliquely irradiated |
| Ex. 2 | Crystalline ITO | 95% | <111> Ip = 0.1 | 82 | 95 | Not Irradiated |
| Ex. 3 | Crystalline ITO | 90% | <110> Ip = — | 71 | 82 | Obliquely Irradiated |
| Ex. 4 | Crystalline ITO | 62% | <111> Ip = 0.24 | 73 | 84 | Obliquely Irradiated |
| Cmp. 1 | Amorphous ITO | 5% (amorphous) | — | 74 | 83 | Obliquely Irradiated |
| Cmp. 2 | Crystalline ITO | 57% | <100> Ip = 0.35 | 68 | 78 | Obliquely Irradiated |

TABLE 1-continued

|  | Alignment Films | Degree of Crystallization | Crystal Orientation Ip value | Transmittance (%, 120 nm) 400 nm | 550 nm | Ion Beam |
|---|---|---|---|---|---|---|
| Cmp. 3 | Crystalline ITO | 67% | <111> Ip = 0.25 | 72 | 82 | Obliquely Irradiated |
| Cmp. 4 | Polyimide (organic) | — | — | 61 | 73 | Obliquely Irradiated |

TABLE 2

| | Liquid crystal Orientation Uniformity | Electrooptical Characteristics Transmittance | CR (5 V) | Reliability/aging After 1,000 hours |
|---|---|---|---|---|
| Ex. 1 | Good | 81% | 325 | No variations in display performance |
| Ex. 2 | Good | 82% | 315 | CR dropped by 10% |
| Ex. 3 | Good | 76% | 298 | No variations in display performance |
| Ex. 4 | Good | 75% | 297 | No variations in display performance |
| Cmp. 1 | Fair (with tilt variations) | 70% | 256 | CR dropped by 45% (with tilt variation increased) |
| Cmp. 2 | Good | 73% | 271 | CR dropped by 15% (with tilt variation sensed) |
| Cmp. 3 | Good | 72% | 276 | CR dropped by 5% (with tilt variation produced) |
| Cmp. 4 | Good | 62% | 242 | Air voids created Poor reliability |

It was confirmed that in the second specific example in which the crystalline ITO films had a high degree of crystallinity and the crystal grains were almost oriented in the same orientation directions, the orientation directions of liquid crystal molecules were also sufficiently uniform. Also, as can be seen easily by comparing the results of the first and second specific examples with each other, the reliability increased when the crystalline conductive films were obliquely exposed to the ion beam. When the surface of the substrates (or more exactly the surface of the crystalline conductive films) that had been exposed to the ion beam was observed with an atomic force microscope (AFM) or a scanning electron microscope (SEM), it was confirmed that a fine groove structure having a regular pattern was defined in the preferential orientation directions of the crystal grains as result of the exposure to the ion beam. Thus, it is believed that the orientation directions of liquid crystal molecules were made further uniform due to the beneficial effects achieved by a combination of such a physical structure and the preferential orientation directions of the crystal grains.

As already described for the respective examples, it was also confirmed that when the crystalline conductive films were subjected to the alignment treatment by irradiating the films with an ion beam from a direction that was associated with the preferential orientation directions of the crystal grains thereof, the liquid crystal molecules could be anisotropically oriented rather constantly. It was further confirmed that compared to the fourth comparative example in which the conventional alignment films of polyimide were used, the transmittance of the LCD panel could be increased significantly and far better results were obtained in the reliability/aging tests (such as seeing if an image persistence phenomenon occurred after a fixed pattern had been displayed).

EXAMPLE NO. 5 AND COMPARATIVE EXAMPLE NO. 5

In a fifth specific example of a preferred embodiment of the present invention and in a fifth comparative example, a projection type liquid crystal display device 200 such as that shown in FIG. 6 was fabricated and the projection performance and aging characteristic thereof were evaluated. In these examples, TFT LCD panels were used as the liquid crystal light bulbs. In the fifth specific example, the display electrodes of the LCD panel were formed as in the first specific example described above. In the fifth comparative example on the other hand, the LCD panel included alignment films of polyimide as in the fourth comparative example described above. The crystalline conductive films and polyimide alignment films were exposed to an ion beam at an angle of incidence of about 37 degrees with respect to a normal to the surface of the substrates. TN-mode TFT LCD panels were completed through similar process steps to those of the first specific example and the fourth comparative example described above.

Neither the LCD panel of the fifth specific example nor the LCD panel of the fifth comparative example caused any serious problem in the orientation state of liquid crystal molecules. An image persistence phenomenon occurred only in the LCD panel of the fifth comparative example, including the alignment films of polyimide, after a fixed pattern had been displayed there for approximately 30 minutes.

The LCD panels of the fifth specific example and the fifth comparative example were subjected to a projection aging test, which was carried out at a panel temperature of about 60° C. and at 1,500 ANSI lumen. As a result, the LCD panel of the fifth specific example showed no significant variations in contrast ratio or in brightness even after 1,000 hours. On the other hand, the LCD panel of the fifth comparative example had its contrast ratio decreased from its initial value by about 30% and its brightness also decreased by about 25% once the aging time exceeded approximately 500 hours. When the LCD panel of the fifth comparative example was observed with a polarizing microscope, it was discovered that a variation in the tilt angle of liquid crystal molecules on a display panel plane, an increase in the area of a reverse tilt region and a decrease in the uniformity of orientation directions of liquid crystal molecules had been brought about by the projection aging.

The liquid crystal display device according to any of various preferred embodiments of the present invention described above includes a pixel electrode and a counter electrode that face each other with a liquid crystal layer interposed between them. However, the present invention is in no way limited to this particular type of liquid crystal display device but is broadly applicable for use in any of various other types of liquid crystal display devices. For example, even in an IPS mode liquid crystal display device in which the two electrodes are provided on the surface of one of the two substrates facing a liquid crystal layer, the inorganic alignment film, as well as the electrodes or lines, can be formed by the same manufacturing process step. Thus, the manufacturing process can also be simplified significantly.

In the specific examples of preferred embodiments of the present invention described above, the crystalline ITO films were used. However, even if the present invention is applied to crystalline Al or Al alloy films, including cubic crystal grains, in substantially the same way, similar effects are also achieved. Also, any other inorganic material may be used as well.

In a liquid crystal display device according to any of various preferred embodiments of the present invention described above, the alignment films thereof are crystalline conductive films made of an inorganic material, and need no rubbing treatment. Thus, a highly reliable liquid crystal display device can be provided by a simplified manufacturing process.

According to various preferred embodiments of the present invention described above, the unwanted dust deposition and uneven treatment, which are often observed in a conventional rubbing treatment, can be eliminated. Thus, various effects including:

(1) removal of pixel defects such as point defects;
(2) elimination of display unevenness from overall pixels and significant reduction in the variation of operating performance between individual products;
(3) excellent display quality including a high contrast ratio, a high brightness, and even moving picture display capabilities; and
(4) high productivity and constant supply of quality products at a reduced cost are achieved by the present invention. The present invention is particularly effectively applicable for use in a high-definition liquid crystal display device that should exhibit rather high display quality (e.g., a projection type liquid crystal display device among other things).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method for fabricating a liquid crystal display device, the device including: a liquid crystal layer; a pair of electrodes for use to apply a voltage to the liquid crystal layer; and at least one inorganic alignment film, which makes direct contact with the liquid crystal layer and which is made of a crystalline conductive film, the method comprising the steps of:

forming the crystalline conductive film, in which crystal grains are oriented in a predetermined direction preferentially, on a substrate; and forming the liquid crystal layer on the crystalline conductive film.

2. The method of claim 1, further comprising the step of irradiating the crystalline conductive film with an energy beam at an angle that is associated with the predetermined direction.

3. The method of claim 2, wherein the step of forming the crystalline conductive film includes the step of forming the crystalline conductive film in which the crystal grains have a cubic crystalline structure and are oriented in <111> directions thereof, and wherein the step of irradiating the crystalline conductive film with the energy beam includes the step of irradiating the crystalline conductive film such that the energy beam defines an angle of incidence of about 30 degrees to about 50 degrees with respect to a normal to the surface of the substrate.

4. The method of claim 2, wherein the step of forming the crystalline conductive film includes the step of forming the crystalline conductive film in which the crystal grains have a cubic crystalline structure and are oriented in <110> directions thereof, and wherein the step of irradiating the crystalline conductive film with the energy beam includes the step of irradiating the crystalline conductive film such that the energy beam defines an angle of incidence of about 35 degrees to about 55 degrees with respect to a normal to the surface of the substrate.

5. The method of claim 2, wherein the step of irradiating the crystalline conductive film with the energy beam includes the step of irradiating the crystalline conductive film with at least one energy beam that is selected from the group consisting of an excimer laser beam, an ultraviolet ray, an electron beam and a particle beam.

* * * * *